Aug. 15, 1950  H. L. BLYDENBURGH  2,519,019
DRIVING MECHANISM FOR POWER LAWN MOWERS
Filed June 25, 1948  2 Sheets-Sheet 2
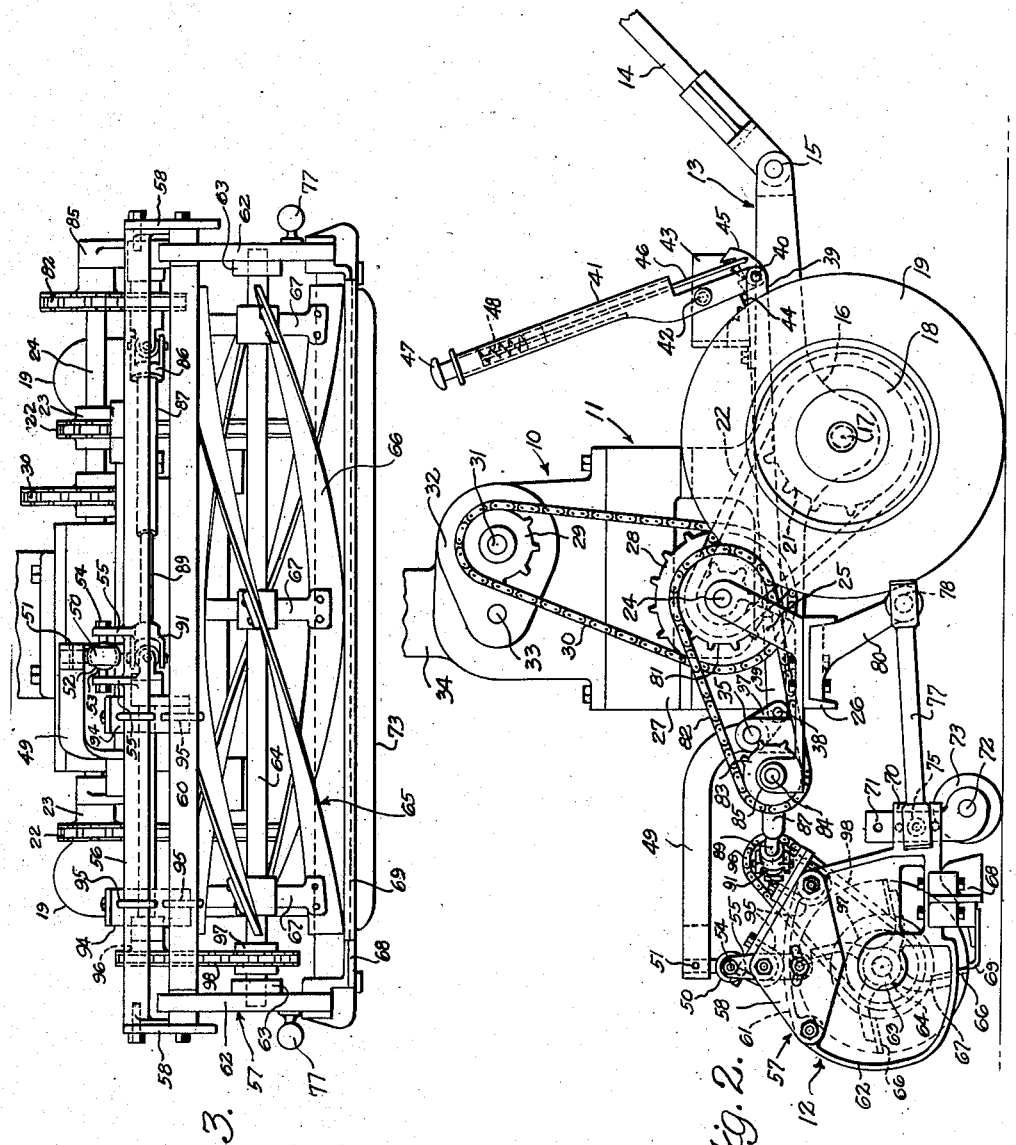
Inventor
Harold L. Blydenburgh
By Barthel + Bugbee
Attorneys Patented Aug. 15, 1950

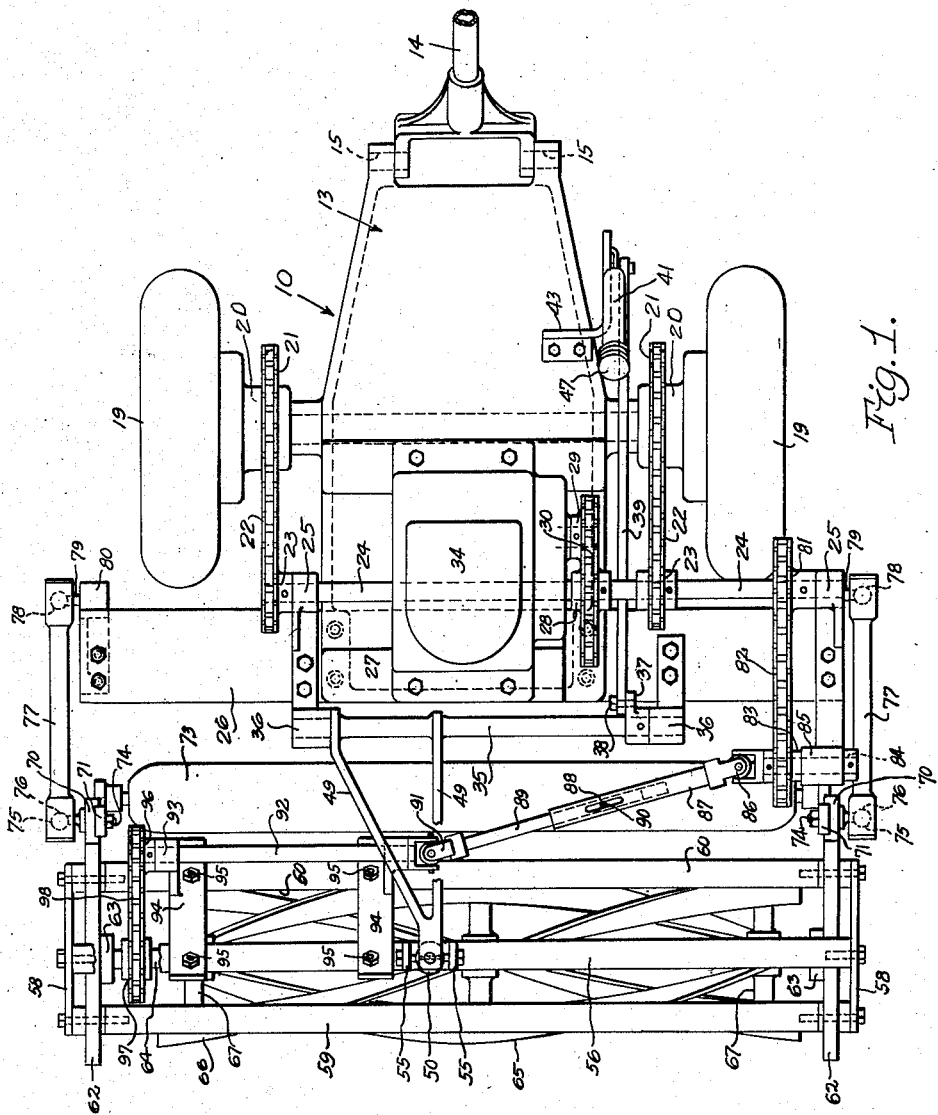

2,519,019

UNITED STATES PATENT OFFICE 2,519,019

DRIVING MECHANISM FOR POWER LAWN MOWERS

Harold L. Blydenburgh, Detroit, Mich., assignor to The Moto-Mower Company, Detroit, Mich., a corporation of Michigan Application June 25, 1948, Serial No. 35,220

6 Claims. (Cl. 56—26)

This invention relates to power lawnmowers and, in particular, to driving mechanism for power lawnmowers.

One object of this invention is to provide a power lawnmower driving mechanism which will be free from any tendency to pull the cutting reel into the ground on the driving side and cause uneven cutting, as in prior power lawnmowers.

Another object is to provide a power lawnmower driving mechanism wherein the drive to the cutting reel is transmitted thereto from a shaft journaled on the cutting reel frame rather than on the lawnmower frame, thereby preventing the above-mentioned pulling effect upon the cutting reel.

Another object is to provide a power lawnmower driving mechanism wherein the cutting reel is journaled in a cutting reel frame which in turn is pivotally connected to the lawnmower frame so as to rise and fall as it traverses uneven ground, the driving force being transmitted from the lawnmower frame to a countershaft journaled on the cutting reel frame so as to rise and fall therewith, the countershaft in turn being drivingly connected to the cutting reel for the purposes above set forth.

In the drawings:

Figure 1 is a top plan view of a power lawnmower equipped with an improved driving mechanism according to a preferred form of the invention;

Figure 2 is a side elevation of the power lawnmower shown in Figure 1; and

Figure 3 is a front elevation of the power lawnmower shown in Figures 1 and 2.

Hitherto, the cutting reels of certain types of power lawn mowers have been journaled in a cutting reel frame, which in turn is pivotally connected to or mounted upon the power lawnmower frame so as to rise and fall as the cutting reel traverses uneven ground. The cutting reel has frequently been driven hitherto by an endless belt or sprocket chain extending from a pulley or sprocket on the cutting reel shaft to a pulley or sprocket on the lawnmower frame. Since the two shafts have ordinarily been separated by a considerable distance, thereby requiring a relatively long belt or sprocket chain, the force exerted by this chain pulled the cutting reel into the ground on the driving side because the lower section of the belt or chain was in tension and hence created an underpull upon the cutting reel pulley or sprocket. This, in turn tended to cut the grass close to the ground on the driving side of the cutting reel, thereby creating a groove or ridge in the grass on the driving side of the cutting reel. This ridge or groove is quite noticeable and is sometimes very unsightly.

The present invention eliminates this underpull upon the cutting reel pulley or sprocket and thereby gets rid of the unequal thrust exerted upon the cutting reel frame on the driving side of the cutting reel. The invention eliminates the previous direct drive from a shaft on the lawnmower frame through a long endless belt or sprocket chain to a sprocket on the end of the cutting reel and accordingly eliminates the unequal torque effect resulting therefrom and tending to tilt the cutting reel frame downward on the driving side. The invention does this by driving to a countershaft on the cutting reel frame and thence to the cutting reel shaft, eliminating any possibility of relative motion between the two pulleys or sprockets, since both move up and down as a unit.

Referring to the drawings in detail, Figures 1 to 3 inclusive show a power lawnmower, generally designated 10, equipped with the improved driving mechanism of the present invention and consisting generally of the main portion or tractor portion 11 of the lawnmower and the cutting reel assembly 12 pivotally connected thereto. The main or tractor portion 11 consists of a lawnmower frame generally designated 13 having a handle 14 pivotally connected as at 15 to the rearward end thereof and having downwardly extending bearing assemblies 16 in which is journaled the axle 17. Ground wheels 18 with tires 19 are mounted on the opposite ends of the axle 17 and have hubs 20 carrying sprockets 21 encircled by sprocket chains 22.

The sprocket chains 22 in turn encircle sprockets 23 mounted on a shaft 24 supported in bearing brackets 25 extending upward from and bolted to a frame cross-member 26. The shaft 24 is journaled in a base structure 27 mounted upon the frame 13 and carries a third sprocket 28 which is drivingly connected to a sprocket 29 by a sprocket chain 30. The sprocket 29 is mounted upon the output shaft 31 of a reduction gear set 32, the input shaft 33 of which is the crankshaft of a conventional internal combustion engine 34. The latter is bolted to the base structure 27. The showing of the engine 34 and output shaft 31 as directly connected to the shaft 24 is conventional and simplified for clearness of showing. Ordinarily, one or more clutches are interposed between the shafts 31 and 24 in order to interrupt the drive, these clutches having been omitted for that reason.

Also journaled in one of the bearing brackets 25 at its forward end is a pivot shaft 35, the opposite end of which is journaled in a bearing bracket 36 also bolted to the frame cross-member 26. Mounted on and secured to the pivot shaft 35 adjacent the bearing bracket 36 is a crank arm 37 having a pivot pin or bolt 38 to which the forward end of a link 39 is pivotally connected. The rearward end of the link 39 is pivotally connected as at 40 to the lower end of a hand lever 41 which in turn is pivotally mounted as at 42 on a bracket 43 bolted to the lawnmower frame 13. The bracket 43 carries a ratchet-toothed quadrant 44 which is engaged by a pawl 45 pivotally mounted on the pivot pin 40 and connected by a link 46 to a push button 47 in the upper end of the hand lever 41. A coil spring 48 constantly urges the push button 47 and link 46 upward, constantly urging the pawl 45 into holding engagement with the teeth 44. As is subsequently explained below, the hand lever 41 is for the purpose of raising and lowering the cutting reel assembly 12.

Also mounted on the pivot shaft 35 and extending upwardly and forwardly therefrom is an approximately triangular arm 49 (Figure 1) to the forward end of which a socket member 50 is pivotally attached as at 51. The socket member 50 forms the outer portion of a universal joint 52, the inner or ball portion 53 of which is mounted on a rod or bolt 54 which is mounted on and extends between a pair of upwardly-directed arms 55 (Figure 3). The arms 55 are connected to and extend upwardly from the upper cross member 56 of the cutting reel frame generally designated 57. The opposite ends of the upper cross member 56 are bolted to approximately diamond shape end plates 58. Extending between and bolted to the lateral corners of the end plates 58 are lower cross members 59 and 60 respectively. Ordinarily, a cover plate extends between the cross members 59 and 60 to conceal the cutting reel and other parts beneath. This cover plate is indicated at 61 in Figure 2, but has been omitted from Figure 1 in order to avoid concealing the parts beneath it. In Figure 1 also, the right-hand end of the upper cross member 56 has been broken away in order to show the driving mechanism beneath it.

Also bolted to the end plates 58 and cross members 59 and 60 are the cutting reel end plates 62. These are roughly circular in diameter and have bearing bosses 63 on the inner sides thereof. Journaled in the bearing bosses 63 is the shaft 64 of a cutting reel, generally designated 65, having spiral blades 66 mounted on the usual spiders 67. Also bolted to the end plates 62 and extending between them is a cutter bar support 68 from the forward edge of which a sharp-edged cutter bar 69 projects forwardly into close proximity to the cutting edges of the spiral blades 66. The end plates 62 are also provided with rearwardly extending lugs or ears 70 which are vertically grooved to receive the end brackets 71 bolted thereto. Mounted in the lower ends of the end brackets 71 is the axle 72 of the ground roller 73 which regulates the distance at which the cutting edges of the cutter bars 69 and cutting blades 66 travel, consequently regulating the height at which the grass is cut.

The end brackets 71 are bolted to the ears 70 by ball-headed bolts 74 (Figure 1), the ball heads 75 of which are received in sockets 76 in the forward ends of link rods 77, the rearward ends of which are provided with similar sockets 78 fitting over the ball-headed bolts 79. The latter are mounted in the lower ends of brackets 80 (Figure 2) extending downward from the lawnmower frame cross member 26 and bolted to the underside thereof. Thus, by the links 77 and the arm 49, the cutting reel assembly 12 is pivotally connected to the main portion 11 of the lawnmower 10.

In order to drive the cutting reel 65, a sprocket 81 is mounted upon the shaft 24 (Figure 2) and, by means of a sprocket chain 82, drives a sprocket 83 mounted on a stub shaft 84 which is journaled in a bearing bushing 85 at the forward end of the left-hand bracket 25. Mounted on the inner end of the stub shaft 84 is a universal joint 86 to which is connected a tubular shaft 87 having one or more longitudinal slots 88 therein. Telescoping into the tubular shaft 88 is a shaft 89 having a driving pin 90 engaging the slots 88 and furnishing a driving yet sliding connection between the shafts 87 and 89. Connected to the inner end of the shaft 89 is a second universal joint 91 which in turn is mounted on the inner end of a countershaft 92 journaled in bearing bosses 93 on the upper ends of brackets 94. The brackets 94 are secured by U-bolts 95 to the cross members 56 and 60 respectively (Figure 3).

Mounted on the outer end of the countershaft 92 is a sprocket 96 which drives a sprocket 97 on the cutting reel shaft 64 by means of a sprocket chain 98. Thus, the countershaft 92 is mounted upon the cutting reel frame 57 so as to move up and down with it as the cutting reel 12 moves over undulating ground. Since the countershaft 92 is driven from the inner end thereof approximately at the center of the cutting reel, such as by the telescoping shafts 87, 89, there is no unbalanced torque applied to the driving end of the cutting reel 12, and consequently no grooving or ridging of the grass or ground occurs during use.

The operation of the invention is believed to be self-evident from the foregoing description, hence a brief summary will suffice. When the internal combustion engine 34 is started in operation, and the necessary clutch (not shown) is closed, the output shaft 31 of the gear box 32 drives the shaft 24 by means of the sprockets 29 and 28 and the sprocket chain 30, and the shaft 24 in turn drives the ground wheels 19 through the sprockets 23 and 21 and the sprocket chain 22. This causes the lawnmower 10 to travel forward under its own power, guided by the hand of the operator on the handle 14. In order to cut grass, the operator depresses the button 47 on the hand lever 41 so as to disengage the pawl 45 from the ratchet quadrant 44. He then swings the hand lever forward so as to swing the arm 49 downward and lower the cutting reel assembly 12 until the ground roller 73 touches the ground.

Meanwhile, the shaft 24 has been driving the stub shaft 84 through the sprockets 81 and 83 and the sprocket chain 82, the drive being communicated to the countershaft 92 (Figure 1) from the telescoping shafts 87 and 89 through the universal joints 86 and 91. The rotation of the countershaft 92 and the consequent rotation of the sprocket 96 mounted on the outer end thereof drives the cutting reel sprocket 97 by means of the sprocket chain 98. Thus, the cutting reel 65 is rotated, cutting the grass between the edges of its cutting blades 66 and the cutter bar 69.

As previously stated in connection with the construction of the invention, since the countershaft 92 is mounted upon the cutting reel frame 57 and driven from a location approximately at the center thereof, there is no unbalanced torque developed which tends to pull one end of the cutting reel assembly 12 downward, as in prior lawnmowers where the cutting reel shaft is driven directly by a sprocket chain or belt from a pulley or sprocket mounted on the lawnmower frame. As a consequence, there is no grooving or ridging of the grass or ground, and an even and smooth mowing job is performed. It will be observed from Figure 1 that the outer end of the triangular arm 49 is positioned slightly off center relatively to the middle of the cutting reel 65. The purpose of this off-center suspension of the cutting reel assembly 12 by the universal joint 52 is to compensate for the slightly greater weight of the cutting reel assembly 12 at the driving end thereof because of the weight of the unbalanced driving mechanism not present at the other end of the cutting reel unit 12. Since the drive shaft 92 is mounted on the cutting reel unit 12 itself, no relative motion can occur between the shaft 92 and the cutting reel shaft 64, other than pure rotatory motion, hence there is no pull exerted by the sprocket chain 98 which acts as an underpull to pull the driving end of the cutting reel assembly 12 downward into the grass or ground.

What I claim is:

1. A power lawnmower comprising a wheel-supported cutting reel unit having a rotary cutting reel thereon, an independent wheel-supported power driven tractor unit carrying a prime mover drivingly connected thereto, said units being disposed one behind the other in tandem relationship, tie members pivotally interconnecting said units, and a cutting reel driving mechanism comprising a countershaft journaled on said cutting reel unit, said countershaft being composed of a pair of shaft sections connected by a universal joint, mechanism including driving and driven wheels on the countershaft and cutting reel respectively, and an endless flexible driving element drivingly connecting one end of said countershaft to the cutting reel, and mechanism drivingly connecting the other end of said countershaft to said prime mover.

2. A power lawnmower comprising a wheel-supported cutting reel unit having a rotary cutting reel thereon, an independent wheel-supported power driven tractor unit carrying a prime mover drivingly connected thereto, said units being disposed one behind the other in tandem relationship, tie members pivotally interconnecting said units at their opposite ends, and a cutting reel driving mechanism comprising a countershaft journaled on said cutting reel unit, said countershaft being composed of a pair of shaft sections connected by a universal joint, mechanism including driving and driven wheels on the countershaft and cutting reel respectively, and an endless flexible driving element drivingly connecting one end of said countershaft to the cutting reel, and mechanism drivingly connecting the other end of said countershaft to said prime mover, the universal joint connecting said shaft sections being located centrally of said cutting reel unit.

3. A power lawnmower comprising a wheel-supported cutting reel unit having a rotary cutting reel thereon, an independent wheel-supported power driven tractor unit carrying a prime mover drivingly connected thereto, said units being disposed one behind the other in tandem relationship, tie members pivotally interconnecting said units at their opposite ends, a central coupling structure mounted on the central portion of said tractor unit and pivotally engaging the central portion of said cutting reel unit, and a cutting reel driving mechanism comprising a countershaft journaled on said cutting reel unit, said countershaft being composed of a pair of shaft sections connected by a universal joint, mechanism including driving and driven wheels on the countershaft and cutting reel respectively, and an endless flexible driving element drivingly connecting one end of said countershaft to the cutting reel, and mechanism drivingly connecting the other end of said countershaft to said prime mover, the universal joint connecting said countershaft sections being located adjacent said central coupling.

4. A power lawnmower comprising a wheel-supported cutting reel unit having a rotary cutting reel thereon, an independent wheel-supported power driven tractor unit carrying a prime mover drivingly connected thereto, said units being disposed one behind the other in tandem relationship, tie members pivotally interconnecting the lower portions of said units at their opposite ends, a central coupling structure mounted on the upper central portion of said tractor unit and pivotally engaging the upper central portion of said cutting reel unit, and a cutting reel driving mechanism comprising a countershaft journaled on said cutting reel unit, said countershaft being composed of a pair of shaft sections connected by a universal joint, mechanism including driving and driven wheels on the countershaft and cutting reel respectively and an endless flexible driving element drivingly connecting one end of said countershaft to the cutting reel, and mechanism drivingly connecting the other end of said countershaft to said prime mover, the universal joint connecting said countershaft sections being located adjacent said central coupling.

5. A power lawnmower comprising a wheel-supported cutting reel unit having a rotary cutting reel thereon, an independent wheel-supported power driven tractor unit carrying a prime mover drivingly connected thereto, said units being disposed one behind the other in tandem relationship, tie members pivotally interconnecting said units at their opposite ends, a central coupling structure mounted on the central portion of said tractor unit and pivotally engaging the central portion of said cutting reel unit, and a cutting reel driving mechanism comprising a countershaft journaled on said cutting reel unit, said countershaft being composed of a pair of shaft sections connected by a universal joint, mechanism including driving and driven wheels on the countershaft and cutting reel respectively, and an endless flexible driving element drivingly connecting one end of said countershaft to the cutting reel, and mechanism drivingly connecting the other end of said countershaft to said prime mover, said last mentioned mechanism including a telescoping shaft drivingly interposed between one of said pair of said countershaft sections and said prime mover, said telescoping shaft having a universal joint at one end drivingly and floatingly connecting said countershaft and prime mover.

6. A power lawnmower comprising a wheel-supported cutting reel unit having a rotary cutting reel thereon, an independent wheel-supported power driven tractor unit carrying a prime mover drivingly connected thereto, said units being disposed one behind the other in tandem relationship, tie members pivotally interconnecting said units at their opposite ends, a central coupling structure mounted on the central portion of said tractor unit and pivotally engaging the central portion of said cutting reel unit, and a cutting reel driving mechanism comprising a countershaft journaled on said cutting reel unit, said countershaft being composed of a pair of shaft sections connected by a universal joint, mechanism including driving and driven wheels on the countershaft and cutting reel respectively and an endless flexible driving element drivingly connecting one end of said countershaft to the cutting reel, and mechanism drivingly connecting the other end of said countershaft to said prime mover, said last mentioned mechanism including a telescoping shaft drivingly interposed between one of said pair of countershaft sections and said prime mover, said telescoping shaft having a universal joint at one end drivingly and floatingly connecting said countershaft and prime mover, the universal joint connecting the countershaft sections being located adjacent said central coupling structure.

HAROLD L. BLYDENBURGH.

REFERENCES CITED

The following references are of record in the file of this patent:

UNITED STATES PATENTS

| Number | Name | Date |
|---|---|---|
| 2,013,597 | Blydenburgh | Sept. 3, 1935 |
| 2,191,135 | Roth | Feb. 20, 1940 |
| 2,191,426 | Clapper | Feb. 20, 1940 |